United States Patent
Oshima et al.

(10) Patent No.: US 9,983,294 B2
(45) Date of Patent: May 29, 2018

(54) RADAR SYSTEM

(71) Applicant: Mitsubishi Electric Corporation, Toyko (JP)

(72) Inventors: Tadashi Oshima, Tokyo (JP); Teruyuki Hara, Tokyo (JP); Kentarou Isoda, Tokyo (JP); Masashi Mitsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 222 days.

(21) Appl. No.: 14/761,610

(22) PCT Filed: Feb. 1, 2013

(86) PCT No.: PCT/JP2013/052375
§ 371 (c)(1),
(2) Date: Jul. 16, 2015

(87) PCT Pub. No.: WO2014/118968
PCT Pub. Date: Aug. 7, 2014

(65) Prior Publication Data
US 2015/0338505 A1 Nov. 26, 2015

(51) Int. Cl.
*G01S 13/93* (2006.01)
*G01S 7/28* (2006.01)
(Continued)

(52) U.S. Cl.
CPC .............. *G01S 7/28* (2013.01); *G01S 13/345* (2013.01); *G01S 13/536* (2013.01); *G01S 13/58* (2013.01);
(Continued)

(58) Field of Classification Search
CPC .......... G01S 7/28; G01S 13/931; G01S 13/34; G01S 13/343; G01S 13/345;
(Continued)

(56) References Cited

U.S. PATENT DOCUMENTS 4,348,675 A * 9/1982 Senzaki ................ G01S 13/931
                                                                        342/128
4,549,181 A * 10/1985 Tachibana ............... G01S 13/62
                                                                        340/901

(Continued)

FOREIGN PATENT DOCUMENTS

| JP | S61-167890 A | 7/1986 |
|----|--------------|--------|
| JP | H09-033642 A | 2/1997 |

(Continued)

OTHER PUBLICATIONS

The extended European search report issued by the European Patent Office dated Jan. 5, 2017, which corresponds to European Patent Application No. 13873525.3-1811 and is related to U.S. Appl. No. 14/761,610.

(Continued)

*Primary Examiner* — Peter M Bythrow
(74) *Attorney, Agent, or Firm* — Studebaker & Brackett PC

(57) ABSTRACT

A stationary object decision processing unit 14 decides whether range R and Doppler frequency $f_d$ corresponding to peaks detected by the peak detection processing unit 13 satisfy geometric positional relationships between a radar and a stationary object. If they satisfy the geometric positional relationships, it recognizes that the object associated with the peaks is a stationary object. Thus, even if the number of peaks detected by the peak detection processing unit 13 increases, it can accurately decide whether the object associated with the peaks is a stationary object or not with a small amount of calculation.

7 Claims, 8 Drawing Sheets

(51) Int. Cl.
*G01S 13/58* (2006.01)
*G01S 13/34* (2006.01)
*G01S 13/536* (2006.01)
*G01S 13/66* (2006.01)

(52) U.S. Cl.
CPC ............ *G01S 13/584* (2013.01); *G01S 13/66* (2013.01); *G01S 13/931* (2013.01); *G01S 2013/9375* (2013.01)

(58) Field of Classification Search
CPC ...... G01S 13/536; G01S 13/58; G01S 13/584; G01S 2013/9375
USPC ...................................................... 342/70–72
See application file for complete search history.

(56) References Cited

U.S. PATENT DOCUMENTS

| | | | | |
|---|---|---|---|---|
| 5,677,695 A * | 10/1997 | Suzuki | ...................... | G01S 7/35 342/109 |
| 6,085,151 A * | 7/2000 | Farmer | .................. | G01S 7/023 342/70 |
| 6,184,819 B1 * | 2/2001 | Adomat | .................. | G01S 13/48 342/107 |
| 6,198,426 B1 * | 3/2001 | Tamatsu | ................ | G01S 13/931 342/114 |
| 6,317,073 B1 * | 11/2001 | Tamatsu | .................. | G01S 7/352 342/109 |
| 6,703,967 B1 * | 3/2004 | Kuroda | ................. | G01S 13/348 342/111 |
| 6,897,804 B1 | 5/2005 | Hager et al. | | |
| 2003/0048216 A1 * | 3/2003 | Kishida | ................ | G01S 7/4008 342/70 |
| 2003/0076255 A1 * | 4/2003 | Ono | ........................ | G01S 13/34 342/70 |
| 2003/0085835 A1 * | 5/2003 | Matsui | .................. | G01S 13/345 342/70 |
| 2003/0214431 A1 | 11/2003 | Hager et al. | | |
| 2004/0246167 A1 * | 12/2004 | Kumon | .................... | G01S 7/41 342/70 |
| 2005/0083227 A1 * | 4/2005 | Takano | ................. | G01S 13/931 342/70 |
| 2005/0156780 A1 * | 7/2005 | Bonthron | ................. | G01S 3/48 342/107 |
| 2005/0174282 A1 * | 8/2005 | Nakanishi | ............... | G01S 7/354 342/109 |
| 2005/0285773 A1 * | 12/2005 | Hartzstein | ............... | G01S 7/032 342/70 |
| 2006/0227037 A1 * | 10/2006 | Ando | .................... | G01S 7/4017 342/70 |
| 2008/0169966 A1 * | 7/2008 | Tsuchihashi | .......... | G01S 7/2922 342/70 |
| 2008/0218402 A1 * | 9/2008 | Matsuura | .............. | G01S 13/584 342/109 |
| 2009/0009381 A1 * | 1/2009 | Inaba | ...................... | G01S 13/34 342/109 |
| 2009/0207068 A1 * | 8/2009 | Inaba | ...................... | G01S 7/354 342/70 |
| 2011/0001656 A1 * | 1/2011 | Nakai | ....................... | G01S 3/74 342/99 |
| 2011/0006941 A1 * | 1/2011 | Samukawa | ........... | G01S 13/345 342/70 |
| 2011/0181456 A1 * | 7/2011 | Luebbert | ............... | G01S 13/343 342/70 |
| 2012/0268313 A1 * | 10/2012 | Shimizu | .................. | G01S 7/412 342/107 |
| 2012/0306685 A1 * | 12/2012 | Asanuma | .............. | G01S 13/931 342/149 |
| 2013/0038484 A1 * | 2/2013 | Ohkado | ................. | G01S 13/345 342/70 |
| 2013/0093613 A1 * | 4/2013 | Itoh | ........................ | G01S 13/345 342/70 |
| 2013/0321195 A1 * | 12/2013 | Moriuchi | ................ | G01S 13/52 342/70 |

FOREIGN PATENT DOCUMENTS

| | | |
|---|---|---|
| JP | 2000-147102 A | 5/2000 |
| JP | 2005-525578 A | 8/2005 |
| JP | 2007-003476 A | 1/2007 |
| JP | 2010-181182 A | 8/2010 |
| JP | 2011-122839 A | 6/2011 |
| WO | 03/104833 A2 | 12/2003 |

OTHER PUBLICATIONS

International Search Report; PCT/JP2013/052375; dated Mar. 5, 2013.

* cited by examiner

RADAR SYSTEM

TECHNICAL FIELD

The present invention relates to a radar system capable of deciding whether an object in a neighborhood is a moving target or a stationary object.

BACKGROUND ART

A conventional radar system employing a frequency modulated continuous wave (FMCW) method generates a triangular transmitted signal whose frequency varies linearly in a fixed frequency band as shown in FIG. 9, emits the transmitted signal into a space as a radar wave, and receives a scattered wave of the transmitted signal reflected from a target and returned.

Then, it mixes the transmitted signal with the received signal to generate a beat signal, and computes a complex amplitude (beat spectrum) corresponding to the frequency of the beat signal (beat frequency) by carrying out Fourier transform of the beat signal.

In addition, when the conventional FMCW radar system computes the beat frequency of the beat signal, it identifies the beat frequency in each sweep interval of an up-chirp in which the frequency of the transmitted signal increases and of a down-chirp in which the frequency decreases, and computes range R to a target and relative velocity V as shown in the following Expressions (1) to (4) from the beat frequency $f_{up}$ at the up-chirp and the beat frequency $f_{down}$ at the down-chirp.

$$f_{up} = -\frac{2B}{cT} + \frac{2Vf_0}{c} \quad (1)$$

$$f_{down} = \frac{2B}{cT} - \frac{2Vf_0}{c} \quad (2)$$

$$R = -\frac{cT}{4B}(f_{up} + f_{down}) \quad (3)$$

$$V = -\frac{cT}{4f_0}(f_{up} - f_{down}) \quad (4)$$

Here, B is the frequency deviation width (sweep bandwidth) of the transmitted signal, $f_0$ is the center frequency of the transmitted signal, T is time (sweep time) taken to carry out modulation of one period.

In addition, V represents the relative velocity between the vehicle and a target, in which the direction of approach is made +frequency, and C is the speed of light.

Incidentally, it is assumed that since the modulation time T is short, the range R to a target and the relative velocity V are invariant during the up-chirp or down-chirp.

Therefore, it can compute the range R to a target and the relative velocity V, and a technique for distinguishing between a moving target and a stationary object using the FMCW radar system is disclosed in the following Patent Document 1.

To distinguish between the moving target and the stationary object, the radar system disclosed in the Patent Document 1 utilizes the fact that when the vehicle is running at velocity –Va, a stationary object approaches at the relative velocity Va so that the relative velocity V in Expression (4) becomes Va.

More specifically, it shifts at least one of the peaks of the beat spectra at the up-chirp and at the down-chirp by a prescribed frequency, computes the degree of spectral match between the beat spectrum at the up-chirp and the beat spectrum at the down-chirp whose peaks correspond to each other, and recognizes that the object associated with the peaks is a stationary object if the degree of the spectral match is high.

PRIOR ART DOCUMENT

Patent Document

Patent Document 1: Japanese Patent Laid-Open No. 2000-147102 (Paragraphs [0017] to [0019]).

DISCLOSURE OF THE INVENTION

Problems to be Solved by the Invention

With the foregoing configuration, the conventional radar system can decides whether the object associated with the peaks is a stationary object or not by computing the degree of the spectral match between the beat spectrum at the up-chirp and the beat spectrum at the down-chirp whose peaks correspond to each other. However, since the amount of computation for the degree of the spectral match is large, when the number of peaks detected is high, a problem arises of an increase of the computation load.

In addition, since the conventional technique is specialized for the radar system with the FMCW method, it has a problem of being inapplicable to a radar system that employs a pulse signal as a radar wave, for example.

The present invention is implemented to solve the foregoing problems. Therefore it is an object of the present invention to provide a radar system capable of accurately deciding whether an object associated with peaks is a stationary object or not by a small amount of calculation in spite of an increase in the number of peaks detected.

Means for Solving the Problems

A radar system in accordance with the present invention comprises: a pulse signal generator that produces a pulse signal; a transmitter-receiver that emits the pulse signal produced by the pulse signal generator into a space, and receives a scattered wave of the pulse signal reflected from a target and returned; a range Doppler map generator that carries out pulse compression of the received signal of the transmitter-receiver using the pulse signal produced by the pulse signal generator, and creates a range Doppler map showing correspondence between range and Doppler frequency by integrating the received signal after the pulse compression for each pulse hit; and a peak detector that detects a peak with signal power not less than a threshold in the range Doppler map created by the range Doppler map generator, wherein a stationary object deciding unit recognizes, if the Doppler frequency corresponding to the peaks detected by the peak detector equals Doppler frequency computed from distance corresponding to the peaks, from a lateral distance from a vehicle to a stationary object, and from velocity of the vehicle, that the object associated with the peaks is a stationary object.

Advantageous of the Invention

According to the present invention, the stationary object deciding unit is configured in such a manner that it recognizes, if the Doppler frequency corresponding to the peaks detected by the peak detector equals the Doppler frequency computed from the distance corresponding to the peaks, from the lateral distance from the vehicle to the stationary object, and from the velocity of the vehicle, that the object associated with the peaks is the stationary object. Accordingly, even if the number of peaks detected by the peak detector increases, it has an advantage of being able to accurately decide whether the object associated with the peaks is the stationary object or not by a small amount of calculation.

BEST MODE FOR CARRYING OUT THE INVENTION

The best mode for carrying out the invention will now be described with reference to the accompanying drawings to explain the present invention in more detail.

Embodiment 1

Figure 1:
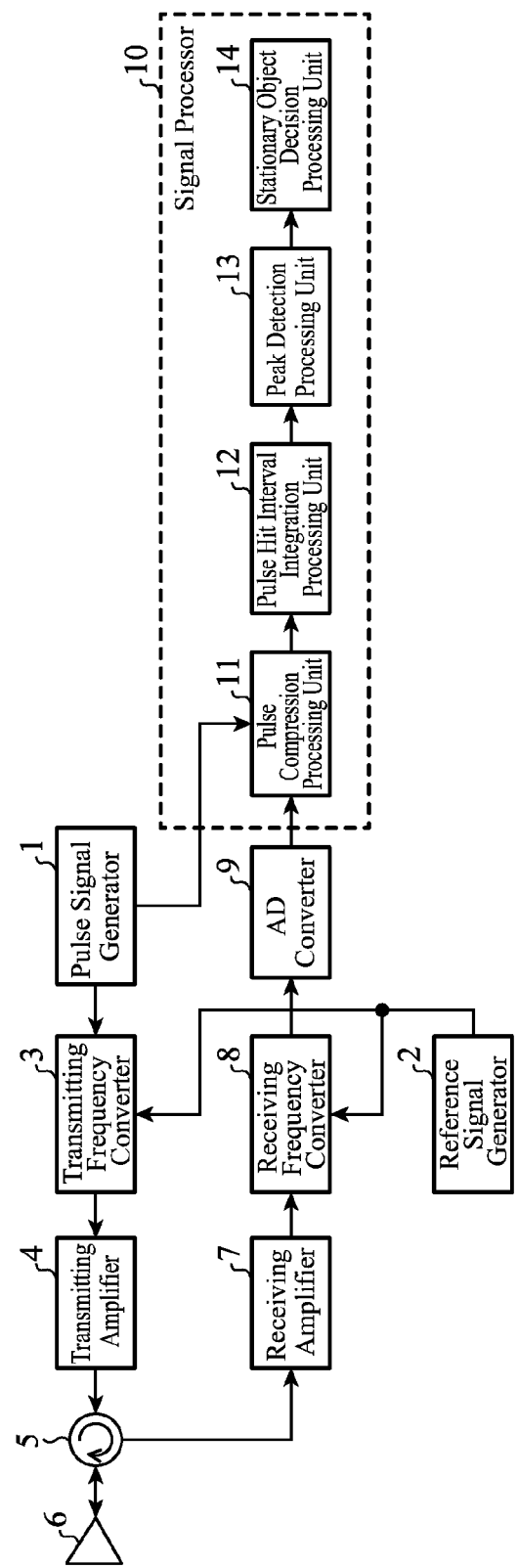
FIG. 1 is a block diagram showing a configuration of a radar system of an embodiment 1 in accordance with the present invention.

FIG. 1 is a block diagram showing a configuration of a radar system of an embodiment 1 in accordance with the present invention.

In FIG. 1, a pulse signal generator 1 is a signal source that repeatedly produces a pulse signal (baseband pulse-shaped modulation waveform with a fixed width) at pulse repetition intervals (PRI). Incidentally, the pulse signal generator 1 constitutes a pulse signal generator.

Although a pulse-shaped modulation waveform is supposed here, there are other waveforms such as a linear frequency modulation (chirp modulation) waveform whose frequency increases in proportion to time, a phase code modulation waveform whose phase varies with time, and a frequency modulation waveform which is a continuous wave or a CW signal whose frequency varies with time.

A reference signal generator 2 is a signal source that produces a reference signal with a prescribed continuous waveform.

A transmitting frequency converter 3, which comprises a multiplier, for example, executes the processing of multiplying the pulse signal produced by the pulse signal generator 1 by the reference signal produced by the reference signal generator 2 to convert the frequency of the pulse signal from an IF band (baseband) to an RF band (high-frequency band), and outputting an RF band pulse signal.

A transmitting amplifier 4, which is comprised of an amplifier, for example, executes the processing of amplifying the RF band pulse signal output from the transmitting frequency converter 3.

A circulator 5 is a signal path switching device that supplies the RF band pulse signal amplified by the transmitting amplifier 4 to a transmitting-receiving antenna 6, or supplies a received signal of the transmitting-receiving antenna 6 to a receiving amplifier 7.

The transmitting-receiving antenna 6 is a device that emits the RF band pulse signal output from the circulator 5 into a space, and that receives a scattered wave of the pulse signal reflected from a target and returned.

The receiving amplifier 7, which is comprised of an amplifier, for example, executes the processing of amplifying the received signal of the transmitting-receiving antenna 6 supplied from the circulator 5.

A receiving frequency converter 8, which is comprised of a multiplier and the like, for example, executes the processing of converting the frequency of the received signal amplified by the receiving amplifier 7 from the RF band to the IF band, and of outputting an IF band received signal.

An AD converter 9 executes the processing of converting the IF band received signal output from the receiving frequency converter 8 from the analog signal to the digital signal.

Incidentally, the reference signal generator 2, transmitting frequency converter 3, transmitting amplifier 4, circulator 5, transmitting-receiving antenna 6, receiving amplifier 7, receiving frequency converter 8 and AD converter 9 constitute a transmitter-receiver.

A signal processor 10 executes the processing of analyzing the digital received signal output from the AD converter 9, and deciding whether an object in a neighborhood is a moving target or a stationary object.

Although the example of FIG. 1 supposes that a pulse compression processing unit 11, a pulse hit interval integration processing unit 12, a peak detection processing unit 13 and a stationary object decision processing unit 14, which are components of the signal processor 10, are each comprised of dedicated hardware (such as a semiconductor integrated circuit incorporating a CPU, or a one-chip microcomputer), the signal processor 10 may be comprised of a computer.

When the signal processor 10 is comprised of a computer, programs describing the processing contents of the pulse compression processing unit 11, pulse hit interval integration processing unit 12, peak detection processing unit 13 and stationary object decision processing unit 14 can be stored in a memory of the computer, and the CPU of the computer can execute the programs stored in the memory.

The pulse compression processing unit 11 executes the processing of pulse compressing the received signal output from the AD converter 9 using the pulse signal produced by the pulse signal generator 1.

The pulse hit interval integration processing unit 12 executes the processing of creating a range Doppler map showing the correspondence between the range and Doppler frequency by integrating the received signal after the pulse compression through the pulse compression processing unit 11 for each pulse hit.

Incidentally, the pulse compression processing unit 11 and the pulse hit interval integration processing unit 12 constitute a range Doppler map generator.

The peak detection processing unit 13 executes the processing of detecting a peak with signal power not less than a threshold in the range Doppler map created by the pulse hit interval integration processing unit 12. Incidentally, the peak detection processing unit 13 constitutes a peak detector.

The stationary object decision processing unit 14 executes the processing of deciding whether the range and Doppler frequency corresponding to the peaks detected by the peak detection processing unit 13 satisfy geometric positional relationships between the radar and the stationary object, and recognizing that the object associated with the peaks is a stationary object if they satisfy the geometric positional relationships. Incidentally, the stationary object decision processing unit 14 constitutes a stationary object deciding unit.

Next, the operation will be described.

First, the pulse signal generator 1 repeatedly produces the pulse signal (baseband pulse-shaped modulation waveform with the fixed width) at the PRI (pulse repetition intervals).

In addition, the reference signal generator 2 produces the reference signal with the prescribed continuous waveform.

When the pulse signal generator 1 produces the pulse signal, the transmitting frequency converter 3 multiplies the pulse signal by the reference signal produced by the reference signal generator 2 to convert the frequency of the pulse signal from the IF band to the RF band, and supplies the RF band pulse signal to the transmitting amplifier 4.

Receiving the RF band pulse signal from the transmitting frequency converter 3, the transmitting amplifier 4 amplifies the pulse signal, and supplies the RF band pulse signal after the amplification to the circulator 5.

The circulator 5, receiving the RF band pulse signal after the amplification from the transmitting amplifier 4, supplies the pulse signal to the transmitting-receiving antenna 6.

Thus, the transmitting-receiving antenna 6 emits the RF band pulse signal into a space. Part of the pulse signal emitted into the space is reflected from the target, and a scattered wave of the pulse signal reflected from the target is received with the transmitting-receiving antenna 6.

The circulator 5 supplies the received signal of the transmitting-receiving antenna 6 to the receiving amplifier 7.

The receiving amplifier 7, receiving the received signal of the transmitting-receiving antenna 6 from the circulator 5, amplifies the received signal, and supplies the received signal after the amplification to the receiving frequency converter 8.

Receiving the received signal after the amplification from the receiving amplifier 7, the receiving frequency converter 8 converts the frequency of the received signal from the RF band to the IF band, and supplies the IF band received signal to the AD converter 9.

The AD converter 9, receiving the IF band received signal from the receiving frequency converter 8, converts the received signal from the analog signal to the digital signal.

Receiving the digital received signal from the AD converter 9, the signal processor 10 analyzes the received signal to decide whether the object in the neighborhood is a moving target or a stationary object.

The processing contents of the signal processor 10 will be described concretely below.

The pulse compression processing unit 11 of the signal processor 10, receiving the digital received signal from the AD converter 9, executes the processing (correlation processing) of pulse compressing the received signal using the pulse signal produced by the pulse signal generator 1.

The pulse hit interval integration processing unit 12 of the signal processor 10, receiving the received signal after the pulse compression from the pulse compression processing unit 11, applies the FFT (Fast Fourier Transform) or DFT (Discrete Fourier Transform) to the received signal after the pulse compression in the pulse hit direction, and calculates the squares of the absolute values of the transform result, thereby creating the range Doppler map showing the correspondence between the range and Doppler frequency.

Figure 2:
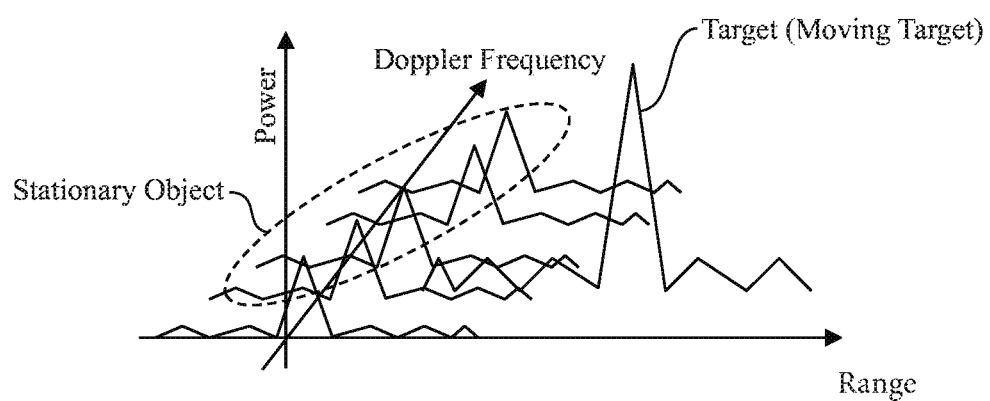
FIG. 2 is a schematic diagram showing an example of creating a range Doppler map.

FIG. 2 is a schematic diagram showing an example of creating the range Doppler map.

In the range Doppler map, not only a peak associated with a moving target (a peak of the signal power), but also peaks associated with a stationary object and the like take place.

In the present embodiment 1, we will give the following description on the assumption that there is no ambiguity about the range and Doppler frequency.

When the pulse hit interval integration processing unit 12 creates the range Doppler map, the peak detection processing unit 13 of the signal processor 10 detects a peak with the signal power not less than a prescribed threshold in the range Doppler map.

Here, although it can use a fixed value as the threshold, it can also use a variable threshold for each range Doppler coverage by executing CFAR (Constant False Alarm Rate: false alarm probability is constant) processing that makes constant the probability of detecting an object other than the target (false alarm probability).

When the peak detection processing unit 13 detects one or more peaks, the stationary object decision processing unit 14 of the signal processor 10 decides whether the range and Doppler frequency corresponding to each peak satisfy the geometric positional relationships between the radar and the stationary object, and recognizes that the object associated with the peaks is a stationary object if they satisfy the geometric positional relationships.

The deciding processing by the stationary object decision processing unit 14 will be described concretely below.

Figure 3:
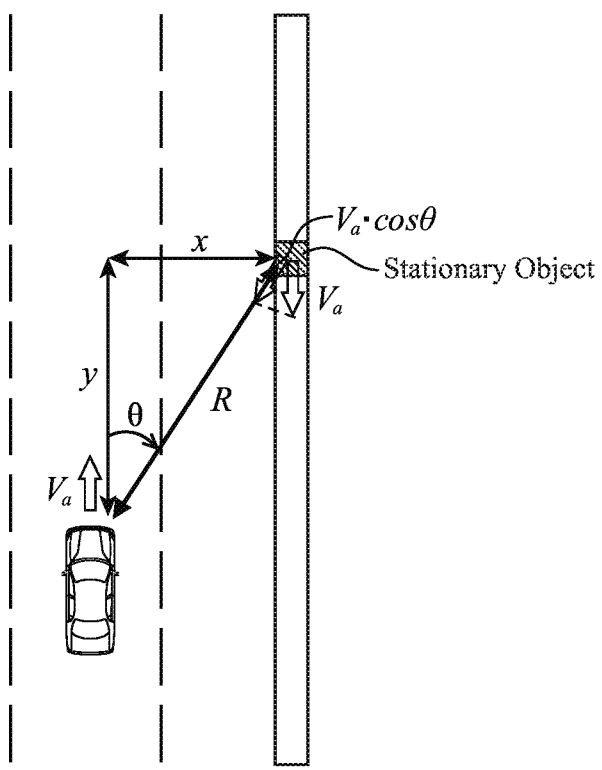
FIG. 3 is a diagram illustrating positional relationships between a vehicle with the radar system of FIG. 1 installed on its front (near its bumper, for example) and a stationary object (a guardrail (reflector) installed in parallel with the direction of travel of the vehicle)

FIG. 3 is a diagram illustrating positional relationships between the vehicle with the radar system of FIG. 1 installed at its front (near the bumper, for example) and a stationary object (a guardrail (reflector) installed in parallel with the direction of travel of the vehicle).

In the example of FIG. 3, there is a stationary object such as a guardrail (reflector) in parallel with the direction of travel of the vehicle. Paying attention to the stationary object at position (x,y), where x is the distance from the vehicle to the stationary object in the lateral direction (referred to as "lateral distance" from now on) and y is the distance from the vehicle to the stationary object in the longitudinal direction (referred to as "longitudinal distance" from now on), the range R from the vehicle to the stationary object and the Doppler frequency $f_d$ are given by the following Expression (5) and Expression (6).

$$R = \sqrt{x^2 + y^2} \qquad (5)$$

$$f_d = \frac{2V_a f_0}{c} \frac{y}{\sqrt{x^2 + y^2}} \quad (6)$$

where, $V_a$ is the velocity of the vehicle.

For example, solving Expression (5) for y and substituting it into Expression (6) will give the following Expression (7).

$$f_d = \frac{2V_a f_0}{c} \frac{\sqrt{R^2 - x^2}}{R} \quad (7)$$

When the peaks detected by the peak detection processing unit 13 are peaks associated with the stationary object at the position (x,y), the range R and Doppler frequency $f_d$ corresponding to the peaks are related by Expression (7).

Accordingly, if the lateral distance x from the vehicle to the stationary object is acquired, the stationary object decision processing unit 14 can decide whether the range R and the Doppler frequency $f_d$ corresponding to the peaks detected by the peak detection processing unit 13 satisfy Expression (7) or not. If they satisfy Expression (7), which means that the geometric positional relationships between the radar and the stationary object are satisfied, the stationary object decision processing unit 14 recognizes that the object associated with the peaks is a stationary object.

In contrast, unless they satisfy Expression (7), which means that the geometric positional relationships between the radar and the stationary object are not satisfied, the stationary object decision processing unit 14 recognizes that the object associated with the peaks is a moving target.

Therefore, to decide whether the object associated with the peaks is a moving target or a stationary object, it is necessary to determine the lateral distance x from the vehicle to the stationary object in advance.

A method of determining the lateral distance x from the vehicle to the stationary object will be described below.

[Method 1 for Determining Lateral Distance x]

The method 1 of determining the lateral distance x is a method of utilizing a fact that reflection from an object just beside the radar becomes specular reflection and shows very high reflection power.

Among the one or more peaks detected by the peak detection processing unit 13, the stationary object decision processing unit 14 identifies the peak with the shortest range R in the peaks whose Doppler frequency $f_d$ is 0.

From Expression (5), the condition for giving the shortest range R is y=0 (R=x), and when y=0, $f_d$=0 from Expression (6). Accordingly, as for the peak whose Doppler frequency $f_d$ is 0, it can be said that the peak is associated with the object that exists just beside the radar.

Then, if the signal power of the peak whose range R is shortest among the peaks with the Doppler frequency $f_d$ of 0 is not less than a prescribed value, it is very likely that the pulse is the reflection from the target existing just beside the radar. Thus, the stationary object decision processing unit 14 estimates that the range R (=x) corresponding to the peak is the lateral distance x to the stationary object.

Incidentally, as the prescribed value to be compared with the signal power of the peak, a value observed by experiment or the like is used.

[Method 2 for Determining Lateral Distance x]

For example, when the radar system has a tracking function or the like of a target, a method is conceivable which observes the lateral distance x from the vehicle to the stationary object by carrying out the tracking processing of the target.

As is clear from the foregoing description, according to the present embodiment 1, it is configured in such a manner that the stationary object decision processing unit 14 decides whether the range R and the Doppler frequency $f_d$ corresponding to the peaks detected by the peak detection processing unit 13 satisfy the geometric positional relationships between the radar and the stationary object or not, and recognizes that the object associated with the peaks is a stationary object if they satisfy the geometric positional relationships. Accordingly, even if the number of peaks detected by the peak detection processing unit 13 increases, it offers an advantage of being able to decide whether the object associated with the peaks is a stationary object or not accurately by a small amount of calculation.

More specifically, it can recognize that the object associated with the peaks is a stationary object only through simple processing of deciding whether Expression (7) is satisfied or not, and since it does not necessitate to execute a large amount of computation to obtain the degree of the spectral match as the conventional example, it can prevent an increase of the computation load even when the number of peaks detected is high.

In addition, the present embodiment 1 differs from the conventional example in that it is applicable to a radar system that utilizes the pulse signal as a radar wave.

Although the present embodiment 1 shows an example in which the stationary object is a straight guardrail, when the stationary object, the guardrail, curves, the method described in the present embodiment 1 can accurately decide whether the object associated with the peaks is a stationary object or not by estimating the curvature from the yaw rate of the vehicle, and by supposing that the guardrail exists on the curve with the curvature.

Embodiment 2

Although the foregoing embodiment 1 shows the case where the stationary object decision processing unit 14 determines the lateral distance x from the vehicle to the stationary object, and decides, using the lateral distance x, whether or not the range R and Doppler frequency $f_d$ corresponding to the peaks detected by the peak detection processing unit 13 satisfy the geometric positional relationships between the radar and the stationary object, a configuration is also possible which decides whether or not the range R and the Doppler frequency $f_d$ corresponding to the peaks detected by the peak detection processing unit 13 satisfy the geometric positional relationships between the radar and the stationary object without determining the lateral distance x from the vehicle to the stationary object.

More specifically, it is as follows.

It is assumed in the present embodiment 2 that the stationary object such as a guardrail exists within a prescribed distance from the vehicle of interest.

For example, it is assumed that the lateral distance x from the vehicle to the stationary object is within the range from 2 to 10 meters. Here, a numerical value 2 meters or 10 meters is only an example.

In this case, at a first stage, for example, the stationary object decision processing unit 14 assumes that the lateral distance x is "2", and decides whether or not the range R and Doppler frequency $f_d$ corresponding to the peaks satisfy the geometric positional relationships between the radar and the stationary object for each peak detected by the peak detection processing unit 13.

At this time, if there is a peak that satisfies the geometric positional relationships between the radar and the stationary object, the stationary object decision processing unit 14 recognizes that the object associated with the peaks is a stationary object.

On the other hand, if none of the range R and Doppler frequency $f_d$ corresponding to all the peaks satisfies the geometric positional relationships between the radar and the stationary object, the stationary object decision processing unit 14 alters the lateral distance x by a prescribed minute distance Δx (Δx=50 cm, for example).

The stationary object decision processing unit 14 assumes that the lateral distance is x+Δx (2.5 meters, for example), and decides for each peak detected by the peak detection processing unit 13 whether or not the range R and Doppler frequency $f_d$ corresponding to the peaks satisfy the geometric positional relationships between the radar and the stationary object.

At this time, if there is a peak that satisfies the geometric positional relationships between the radar and the stationary object, the stationary object decision processing unit 14 recognizes that the object associated with the peak is a stationary object.

If none of the range R and Doppler frequency $f_d$ corresponding to all the peaks satisfies the geometric positional relationships between the radar and the stationary object, the stationary object decision processing unit 14 alters the lateral distance x+Δx after the alteration step-by-step until it reaches 10 meters, and decides whether or not the range R and Doppler frequency $f_d$ corresponding to the peaks satisfy the geometric positional relationships between the radar and the stationary object for each peak detected by the peak detection processing unit 13 on the assumption that the lateral distance is x+Δx.

Incidentally, as for the minute distance Δx, unless it is small enough, it is likely that a peak that satisfies the geometric positional relationships between the radar and the stationary object cannot be found. Thus, it is best for the minute distance Δx to be as small as possible. However, if the minute distance Δx is too small, the amount of computation increases.

Accordingly, the minute distance Δx is set at an appropriate value (Δx=50 cm, for example), so that even if the geometric positional relationships between the radar and the stationary object are not satisfied accurately, if the shift of the geometric positional relationships is within a prescribed allowance, the stationary object decision processing unit 14 decides that the geometric positional relationships are satisfied.

As is clear from the foregoing description, according to the present embodiment 2, the stationary object decision processing unit 14 is configured in such a manner that for each peak detected by the peak detection processing unit 13, it decides whether or not the range R and Doppler frequency $f_d$ corresponding to the peak satisfy the geometric positional relationships between the radar and the stationary object using the lateral distance x set in advance, and that if none of the range R and Doppler frequency $f_d$ corresponding to all the peaks detected by the peak detection processing unit 13 satisfies the geometric positional relationships, it alters the lateral distance x, and decides, using the lateral distance x+Δx after the alteration, whether or not the range R and Doppler frequency $f_d$ corresponding to the peaks satisfy the geometric positional relationships between the radar and the stationary object. Accordingly, the present embodiment 2 offers an advantage of being able to decide whether the object associated with the peaks is a stationary object or not accurately without determining the lateral distance x from the vehicle to the stationary object.

Embodiment 3

The foregoing embodiment 1 shows an example which assumes that there is no ambiguity about the range R and Doppler frequency $f_d$. In practice, however, either the range R or the Doppler frequency $f_d$ has ambiguity in general.

Accordingly, the present embodiment 3 shows an example that can accurately decide whether the object associated with peaks is a stationary object or not even if either the range R or the Doppler frequency $f_d$ has ambiguity.

Figure 4:
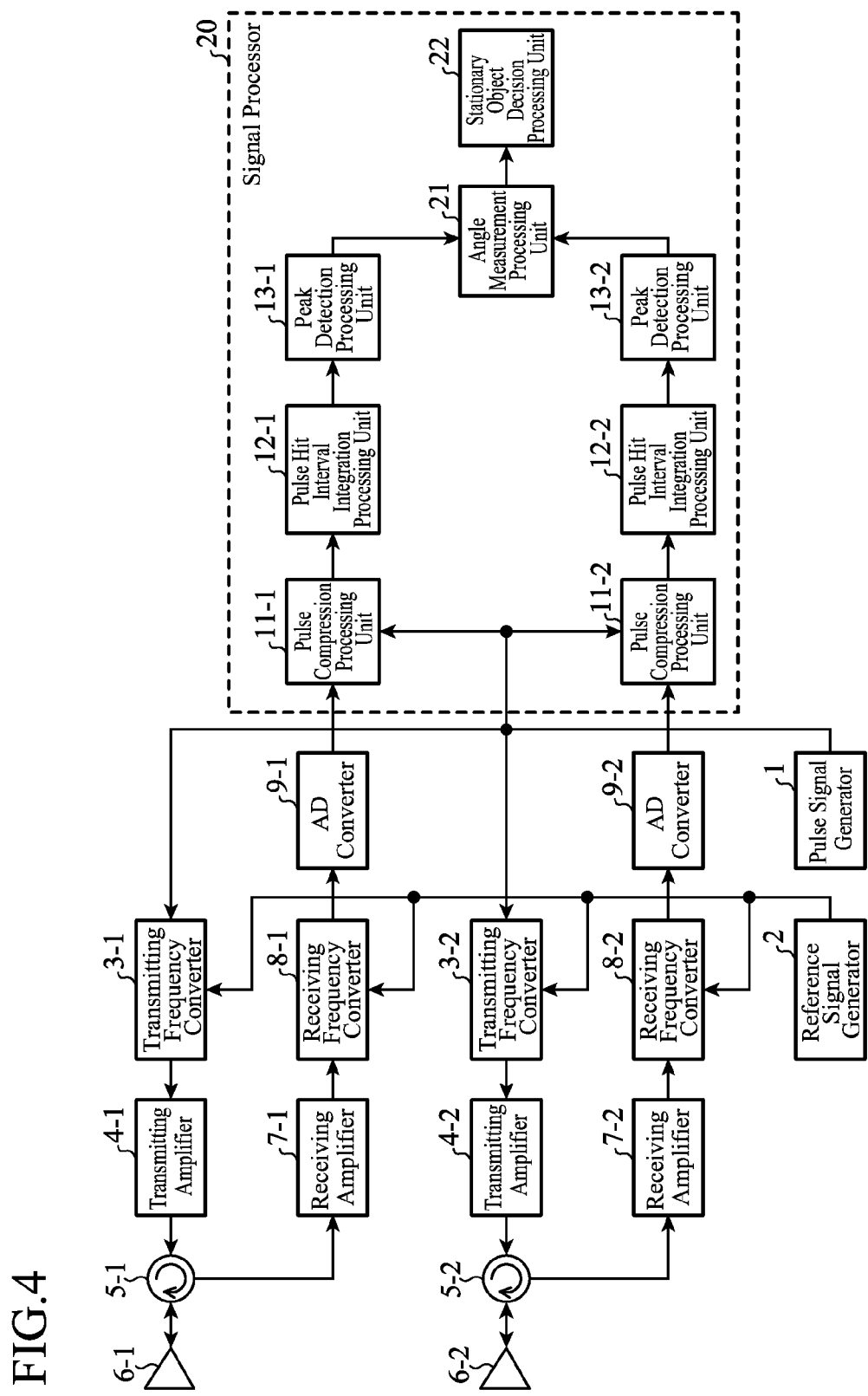
FIG. 4 is a block diagram showing a configuration of a radar system of an embodiment 3 in accordance with the present invention.

FIG. 4 is a block diagram showing a configuration of a radar system of the embodiment 3 in accordance with the present invention. In FIG. 4, since the same reference symbols designate the same or like components in FIG. 1, their description will be omitted.

A transmitting frequency converter 3-1, which is comprised of a multiplier and others, for example, executes the processing of multiplying the pulse signal produced by the pulse signal generator 1 by the reference signal produced by the reference signal generator 2 to convert the frequency of the pulse signal from the IF band to the RF band, and outputting the RF band pulse signal.

A transmitting amplifier 4-1, which is comprised of an amplifier and others, for example, executes the processing of amplifying the RF band pulse signal output from the transmitting frequency converter 3-1.

A circulator 5-1 is a signal path switching device that supplies the RF band pulse signal amplified by the transmitting amplifier 4-1 to a transmitting-receiving antenna 6-1, and supplies the received signal of the transmitting-receiving antenna 6-1 to a receiving amplifier 7-1.

The transmitting-receiving antenna 6-1 is a device that emits the RF band pulse signal output from the circulator 5-1 into a space, and receives a scattered wave of the pulse signal reflected from a target and returned.

The receiving amplifier 7-1, which is comprised of an amplifier and others, for example, executes the processing of amplifying the received signal of the transmitting-receiving antenna 6-1 output from the circulator 5-1.

A receiving frequency converter 8-1, which is comprised of a multiplier and others, for example, executes the processing of converting the frequency of the received signal amplified by the receiving amplifier 7-1 from the RF band to the IF band, and outputting the IF band received signal.

An AD converter 9-1 executes the processing of converting the IF band received signal output from the receiving frequency converter 8-1 from the analog signal to the digital signal.

Incidentally, the reference signal generator 2, the transmitting frequency converter 3-1, the transmitting amplifier 4-1, the circulator 5-1, the transmitting-receiving antenna 6-1, the receiving amplifier 7-1, the receiving frequency converter 8-1 and the AD converter 9-1 constitute a transmitter-receiver.

A transmitting frequency converter 3-2, which is comprised of a multiplier and others, for example, executes the processing of multiplying the pulse signal produced by the pulse signal generator 1 by the reference signal produced by the reference signal generator 2 to convert the frequency of the pulse signal from the IF band to the RF band, and outputting the RF band pulse signal.

A transmitting amplifier 4-2, which is comprised of an amplifier and others, for example, executes the processing of amplifying the RF band pulse signal output from the transmitting frequency converter 3-2.

A circulator 5-2 is a signal path switching device that supplies the RF band pulse signal amplified by the transmitting amplifier 4-2 to a transmitting-receiving antenna 6-2, and that supplies the received signal of the transmitting-receiving antenna 6-2 to a receiving amplifier 7-2.

The transmitting-receiving antenna 6-2 is a device that emits the RF band pulse signal output from the circulator 5-2 into a space, and that receives a scattered wave of the pulse signal reflected from a target and returned.

The receiving amplifier 7-2, which is comprised of an amplifier and others, for example, executes the processing of amplifying the received signal of the transmitting-receiving antenna 6-2 output from the circulator 5-2.

A receiving frequency converter 8-2, which is comprised of a multiplier and others, for example, executes the processing of converting the frequency of the received signal amplified by the receiving amplifier 7-2 from the RF band to the IF band, and outputting the IF band received signal.

An AD converter 9-2 executes the processing of converting the IF band received signal output from the receiving frequency converter 8-2 from the analog signal to the digital signal.

Incidentally, the reference signal generator 2, the transmitting frequency converter 3-2, the transmitting amplifier 4-2, the circulator 5-2, the transmitting-receiving antenna 6-2, the receiving amplifier 7-2, the receiving frequency converter 8-2 and the AD converter 9-2 constitute a transmitter-receiver.

A signal processor 20 executes the processing of analyzing the digital received signals output from the AD converters 9-1 and 9-2, and deciding whether an object in a neighborhood is a moving target or a stationary object.

Although the example of FIG. 4 supposes that pulse compression processing units 11-1 and 11-2, pulse hit interval integration processing units 12-1 and 12-2, peak detection processing units 13-1 and 13-2, an angle measurement processing unit 21 and a stationary object decision processing unit 22, which are components of the signal processor 20, are each comprised of dedicated hardware (such as a semiconductor integrated circuit incorporating a CPU, or a one-chip microcomputer), the signal processor 20 may be comprised of a computer.

When the signal processor 20 is comprised of a computer, programs describing the processing contents of the pulse compression processing units 11-1 and 11-2, pulse hit interval integration processing units 12-1 and 12-2, peak detection processing units 13-1 and 13-2, angle measurement processing unit 21 and stationary object decision processing unit 22 can be stored in a memory of the computer, and the CPU of the computer can execute the programs stored in the memory.

The pulse compression processing unit 11-1 executes the processing of pulse compressing the received signal output from the AD converter 9-1 using the pulse signal produced by the pulse signal generator 1.

The pulse hit interval integration processing unit 12-1 executes the processing of creating a range Doppler map showing the correspondence between the range and Doppler frequency by integrating the received signal after the pulse compression through the pulse compression processing unit 11-1 for each pulse hit.

Incidentally, the pulse compression processing unit 11-1 and the pulse hit interval integration processing unit 12-1 constitute a range Doppler map generator.

The peak detection processing unit 13-1 executes the processing of detecting a peak with signal power not less than a threshold in the range Doppler map created by the pulse hit interval integration processing unit 12-1. Incidentally, the peak detection processing unit 13-1 constitutes a peak detector.

The pulse compression processing unit 11-2 executes the processing of pulse compressing the received signal output from the AD converter 9-2 using the pulse signal produced by the pulse signal generator 1.

The pulse hit interval integration processing unit 12-2 executes the processing of creating a range Doppler map showing the correspondence between the range and Doppler frequency by integrating the received signal after the pulse compression through the pulse compression processing unit 11-2 for each pulse hit.

Incidentally, the pulse compression processing unit 11-2 and the pulse hit interval integration processing unit 12-2 constitute the range Doppler map generator.

The peak detection processing unit 13-2 executes the processing of detecting a peak with signal power not less than a threshold in the range Doppler map created by the pulse hit interval integration processing unit 12-2. Incidentally, the peak detection processing unit 13-2 constitutes a peak detector.

The angle measurement processing unit 21 executes the processing of measuring the incident angle of a scattered wave on the antennas 6-1 and 6-2 by using phase difference between a peak detected by the peak detection processing unit 13-1 and a peak detected by the peak detection processing unit 13-2. Incidentally, the angle measurement processing unit 21 constitutes an angle measuring unit.

The stationary object decision processing unit 22 executes the processing of deciding whether the range and Doppler frequency corresponding to the peaks detected by the peak detection processing units 13-1 and 13-2 agree with the range and Doppler frequency obtained from the incident angle measured by the angle measurement processing unit 21, and recognizing that the object associated with the peaks is a stationary object if the range or Doppler frequency agrees. Incidentally, the stationary object decision processing unit 22 constitutes a stationary object deciding unit.

Although the present embodiment 3 shows a radar system that comprises two systems of the processing units other than the pulse signal generator 1 and the reference signal generator 2, a configuration comprising three or more systems is possible.

Next, the operation will be described.

First, the pulse signal generator 1 repeatedly generates the pulse signal at the PRI in the same manner as in the foregoing embodiment 1.

In addition, the reference signal generator 2 generates the reference signal with the prescribed continuous waveform.

When the pulse signal generator 1 produces the pulse signal, the transmitting frequency converter 3-1 multiplies the pulse signal by the reference signal produced by the reference signal generator 2 to convert the frequency of the pulse signal from the IF band to the RF band, and supplies the RF band pulse signal to the transmitting amplifier 4-1 in the same manner as the transmitting frequency converter 3 of FIG. 1.

Receiving the RF band pulse signal from the transmitting frequency converter 3-1, the transmitting amplifier 4-1 amplifies the pulse signal, and supplies the RF band pulse signal after the amplification to the circulator 5-1 in the same manner as the transmitting amplifier 4 of FIG. 1.

The circulator 5-1, receiving the RF band pulse signal after the amplification from the transmitting amplifier 4-1, supplies the pulse signal to the transmitting-receiving antenna 6-1 in the same manner as the circulator 5 of FIG. 1.

Thus, the transmitting-receiving antenna 6-1 emits the RF band pulse signal into a space. Part of the pulse signal emitted into the space is reflected from the target, and a scattered wave of the pulse signal reflected from the target is received with the transmitting-receiving antenna 6-1.

The circulator 5-1 supplies the received signal of the transmitting-receiving antenna 6-1 to the receiving amplifier 7-1.

The receiving amplifier 7-1, receiving the received signal of the transmitting-receiving antenna 6-1 from the circulator 5-1, amplifies the received signal, and supplies the received signal after the amplification to the receiving frequency converter 8-1 in the same manner as the receiving amplifier 7 of FIG. 1.

Receiving the received signal after the amplification from the receiving amplifier 7-1, the receiving frequency converter 8-1 converts the frequency of the received signal from the RF band to the IF band, and supplies the IF band received signal to the AD converter 9-1 in the same manner as the receiving frequency converter 8 of FIG. 1.

The AD converter 9-1, receiving the IF band received signal from the receiving frequency converter 8-1, converts the received signal from the analog signal to the digital signal in the same manner as the AD converter 9 of FIG. 1.

When the pulse signal generator 1 produces the pulse signal, the transmitting frequency converter 3-2 multiplies the pulse signal by the reference signal produced by the reference signal generator 2 to convert the frequency of the pulse signal from the IF band to the RF band, and supplies the RF band pulse signal to the transmitting amplifier 4-2 in the same manner as the transmitting frequency converter 3 of FIG. 1

Receiving the RF band pulse signal from the transmitting frequency converter 3-2, the transmitting amplifier 4-2 amplifies the pulse signal, and supplies the RF band pulse signal after the amplification to the circulator 5-2 in the same manner as the transmitting amplifier 4 of FIG. 1.

The circulator 5-2, receiving the RF band pulse signal after the amplification from the transmitting amplifier 4-2, supplies the pulse signal to the transmitting-receiving antenna 6-2 in the same manner as the circulator 5 of FIG. 1.

Thus, the transmitting-receiving antenna 6-2 emits the RF band pulse signal into a space. Part of the pulse signal emitted into the space is reflected from the target, and a scattered wave of the pulse signal reflected from the target is received with the transmitting-receiving antenna 6-2.

The circulator 5-2 supplies the received signal of the transmitting-receiving antenna 6-2 to the receiving amplifier 7-2.

The receiving amplifier 7-2, receiving the received signal of the transmitting-receiving antenna 6-2 from the circulator 5-2, amplifies the received signal, and supplies the received signal after the amplification to the receiving frequency converter 8-2 in the same manner as the receiving amplifier 7 of FIG. 1.

Receiving the received signal after the amplification from the receiving amplifier 7-2, the receiving frequency converter 8-2 converts the frequency of the received signal from the RF band to the IF band, and supplies the IF band received signal to the AD converter 9-2 in the same manner as the receiving frequency converter 8 of FIG. 1.

The AD converter 9-2, receiving the IF band received signal from the receiving frequency converter 8-2, converts the received signal from the analog signal to the digital signal in the same manner as the AD converter 9 of FIG. 1.

Receiving the digital received signals from the AD converters 9-1 and 9-2, the signal processor 20 analyzes the received signals to decide whether the object in the neighborhood is a moving target or a stationary object.

The processing contents of the signal processor 20 will be described concretely below.

The pulse compression processing unit 11-1 of the signal processor 20, receiving the digital received signal from the AD converter 9-1, executes the processing (correlation processing) of pulse compressing the received signal using the pulse signal produced by the pulse signal generator 1 in the same manner as the pulse compression processing unit 11 of FIG. 1.

The pulse compression processing unit 11-2 of the signal processor 20, receiving the digital received signal from the AD converter 9-2, executes the processing (correlation processing) of pulse compressing the received signal using the pulse signal produced by the pulse signal generator 1 in the same manner as the pulse compression processing unit 11 of FIG. 1.

The pulse hit interval integration processing unit 12-1 of the signal processor 20, receiving the received signal after the pulse compression from the pulse compression processing unit 11-1, applies the FFT or DFT to the received signal after the pulse compression in the pulse hit direction in the same manner as the pulse hit interval integration processing unit 12 of FIG. 1, and calculates the squares of the absolute values of the transform result, thereby creating the range Doppler map showing the correspondence between the range and Doppler frequency.

Likewise, the pulse hit interval integration processing unit 12-2 of the signal processor 20, receiving the received signal after the pulse compression from the pulse compression processing unit 11-2, applies the FFT or DFT to the received signal after the pulse compression in the pulse hit direction in the same manner as the pulse hit interval integration processing unit 12 of FIG. 1, and calculates the squares of the absolute values of the transform result, thereby creating the range Doppler map showing the correspondence between the range and Doppler frequency.

The present embodiment 3 assumes that it differs from the foregoing embodiment 1 in that it has ambiguity in either the range or Doppler frequency.

When the pulse hit interval integration processing unit 12-1 creates the range Doppler map, the peak detection processing unit 13-1 of the signal processor 20 detects a peak with the signal power not less than a prescribed threshold in the range Doppler map in the same manner as the peak detection processing unit 13 of FIG. 1.

When the pulse hit interval integration processing unit 12-2 creates the range Doppler map, the peak detection processing unit 13-2 of the signal processor 20 detects a peak with the signal power not less than a prescribed threshold in the range Doppler map in the same manner as the peak detection processing unit 13 of FIG. 1.

The angle measurement processing unit 21 of the signal processor 20 measures the incident angle θ of a scattered wave on the antennas 6-1 and 6-2 using the phase difference between the peak detected by the peak detection processing unit 13-1 and the peak detected by the peak detection processing unit 13-2. As an angle measurement method, there is a phase difference angle measurement method or a mono-pulse angle measurement method, for example. In addition, a high resolution technique such as MUSIC (Multiple Signal Classification) can be applied.

When the peaks detected by the peak detection processing units 13-1 and 13-2 are associated with the signal reflected from a stationary object such as a guardrail, the relationships given by the following Expressions (8) and (9) hold between the incident angle θ measured by the angle measurement processing unit 21 and the range R and Doppler frequency $f_d$ corresponding to the peak.

$$R = \frac{x}{\sin\theta} \quad (8)$$

$$f_d = \frac{2V_a f_0}{c} \cos\theta \quad (9)$$

When the angle measurement processing unit 21 measures the incident angle θ of a scattered wave on the antennas 6-1 and 6-2, the stationary object decision processing unit 22 of the signal processor 20 calculates the range R by substituting the incident angle θ into Expression (8), and the Doppler frequency $f_d$ by substituting the incident angle θ into Expression (9).

Then, the stationary object decision processing unit 22 decides whether the range R and Doppler frequency $f_d$ corresponding to the peaks detected by peak detection processing units 13-1 and 13-2 agree with the range R and Doppler frequency $f_d$ calculated by Expressions (8) and (9) or not, and if either the range R or Doppler frequency $f_d$ agrees, it recognizes that the object associated with the peaks is a stationary object.

If none of the range R and Doppler frequency $f_d$ agrees, it recognizes that the object associated with the peaks is a moving target.

As is clear from the foregoing description, according to the present embodiment 3, it is configured in such a manner that it comprises the angle measurement processing unit 21 that measures the incident angle θ of a scattered wave on the antennas 6-1 and 6-2 using the peak detected by the peak detection processing unit 13-1 and the peak detected by the peak detection processing unit 13-2, wherein the stationary object decision processing unit 22 decides whether the range R and Doppler frequency $f_d$ corresponding to the peaks detected by the peak detection processing units 13-1 and 13-2 agree with the range R and Doppler frequency $f_d$ obtained from the incident angle θ measured by the angle measurement processing unit 21 or not, and when the range R or Doppler frequency $f_d$ agrees, it recognizes that the object associated with the peaks is a stationary object. Accordingly, it offers an advantage of being able to accurately decide whether the object associated with the peaks is a stationary object or not even if either the range R or Doppler frequency $f_d$ has ambiguity.

Embodiment 4

Figure 5:
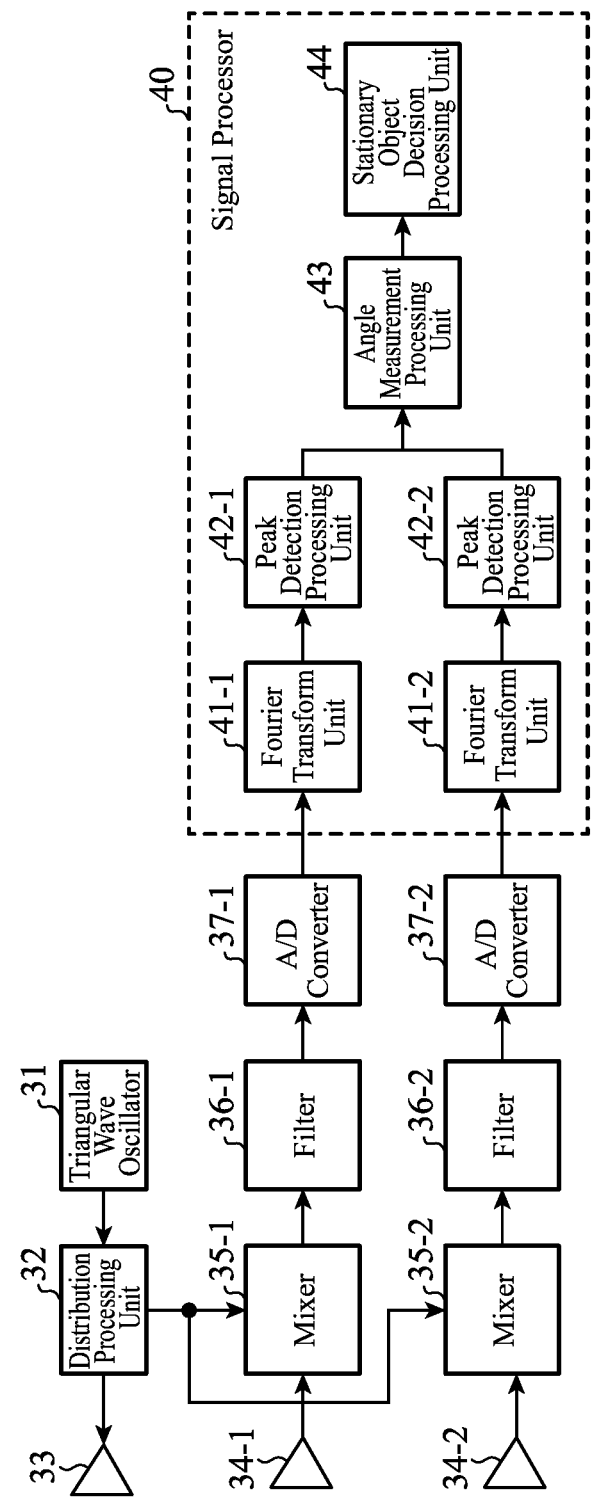
FIG. 5 is a block diagram showing a configuration of a radar system of an embodiment 4 in accordance with the present invention.

FIG. 5 is a block diagram showing a configuration of a radar system of an embodiment 4 in accordance with the present invention. The radar system of FIG. 5 is a radar system based on the FMCW method.

Although a configuration comprising a single transmitting antenna and two receiving antennas will be described in the present embodiment 4, a configuration comprising two or more transmitting antennas and three or more receiving antennas is possible.

In FIG. 5, a triangular wave oscillator 31 is a signal source that produces a triangular wave transmitted signal whose frequency increases or decreases linearly in a fixed frequency band. Incidentally, the triangular wave oscillator 31 constitutes a transmitted signal generator.

A distribution processing unit 32 executes the processing of distributing the transmitted signal generated by the triangular wave oscillator 31 to a transmitting antenna 33 and to mixers 35-1 and 35-2.

The transmitting antenna 33 is a device that emits the transmitted signal distributed by the distribution processing unit 32 into a space. Incidentally, the distribution processing unit 32 and transmitting antenna 33 constitute a signal transmitter.

Receiving antennas 34-1 and 34-2 are a device that receives a scattered wave of the transmitted signal emitted from the transmitting antenna 33 and reflected from a target and returned. Incidentally, the receiving antennas 34-1 and 34-2 constitute signal receivers.

The mixers 35-1 and 35-2 execute the processing of mixing the transmitted signal distributed by the distribution processing unit 32 with the received signals of the receiving antennas 34-1 and 34-2, and of generating beat signals which are the mixed signals (sine wave signals with the frequency difference between the transmitted signal and the received signals). Incidentally, the mixers 35-1 and 35-2 constitute beat signal generators.

Filters 36-1 and 36-2 execute the processing of eliminating noise components and the like superposed on the beat signals generated by the mixers 35-1 and 35-2.

Although the example of FIG. 5 comprises the filters 36-1 and 36-2, the filters 36-1 and 36-2 may be removed.

A/D converters 37-1 and 37-2 execute the processing of converting the beat signals output from the filters 36-1 and 36-2 from analog signals to digital signals.

A signal processor 40 executes the processing of analyzing the digital beat signals output from the AD converters 37-1 and 37-2, and of deciding whether an object in a neighborhood is a moving target or a stationary object.

Although it is supposed in the example of FIG. 5 that the components of the signal processor 40, that is, Fourier transform units 41-1 and 41-2, peak detection processing units 42-1 and 42-2, an angle measurement processing unit 43 and a stationary object decision processing unit 44 are each comprised of dedicated hardware (for example, a semiconductor integrated circuit including a CPU, or a one-chip microcomputer), the signal processor 40 may be comprised of a computer.

When the signal processor 40 is comprised of a computer, programs describing the processing contents of the Fourier transform units 41-1 and 41-2, peak detection processing units 42-1 and 42-2, angle measurement processing unit 43 and stationary object decision processing unit 44 can be stored in a memory of the computer, and the CPU of the computer can execute the programs stored in the memory.

The Fourier transform units 41-1 and 41-2 execute the processing of calculating beat spectra of the beat signals by carrying out the Fourier transform of the digital beat signals output from the AD converters 37-1 and 37-2. Incidentally, the Fourier transform units 41-1 and 41-2 constitute beat spectrum computing units.

The peak detection processing units 42-1 and 42-2 execute the processing of detecting peaks of the beat spectra calculated by the Fourier transform units 41-1 and 41-2.

Incidentally, the peak detection processing units 42-1 and 42-2 constitute peak detectors.

The angle measurement processing unit 43 executes the processing of measuring the incident angle of a scattered wave on the receiving antennas 34-1 and 34-2 by using the phase difference between the peak detected by the peak detection processing unit 42-1 and the peak detected by the peak detection processing unit 42-2. Incidentally, the angle measurement processing unit 43 constitute an angle measuring unit.

The stationary object decision processing unit 44 executes the processing of deciding whether the object associated with the peaks detected by the peak detection processing units 42-1 and 42-2 is a stationary object or not by using the incident angle measured by the angle measurement processing unit 43.

More specifically, the stationary object decision processing unit 44 executes the processing of deciding whether the difference between the incident angle measured by the angle measurement processing unit 43 and the incident angle of a scattered wave obtained from the beat frequency of the peaks detected by the peak detection processing units 42-1 and 42-2 is within a prescribed value or not, and recognizing that the object associated with the peaks is a stationary object if the difference is within the prescribed value. Incidentally, the stationary object decision processing unit 44 constitute a stationary object deciding unit.

Next, the operation will be described.

Figure 9:
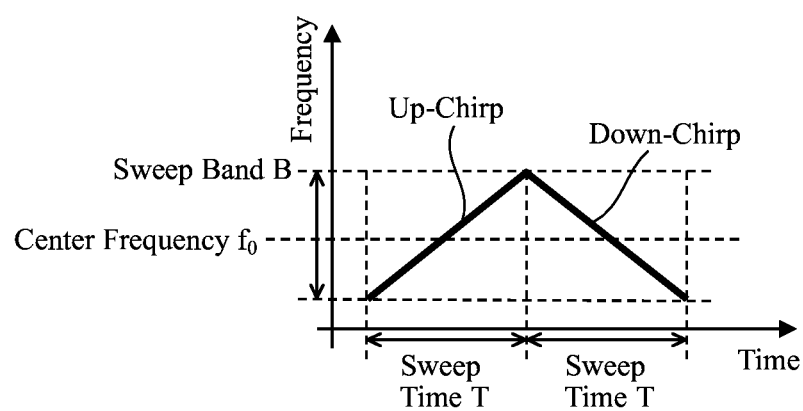
FIG. 9 is a diagram showing a triangular transmitted signal whose frequency varies linearly within a fixed frequency band.

First, the triangular wave oscillator 31 generates the transmitted signal with the triangular wave whose frequency increases or decreased linearly within the fixed frequency band (see FIG. 9).

When the triangular wave oscillator 31 generates the transmitted signal, the distribution processing unit 32 distributes the transmitted signal to the transmitting antenna 33 and mixers 35-1 and 35-2.

The transmitting antenna 33, receiving the transmitted signal distributed by the distribution processing unit 32, emits the transmitted signal into the space.

Part of the transmitted signal emitted into the space by the transmitting antenna 33 is reflected from the target, and a scattered wave of the transmitted signal reflected from the target is received with the receiving antennas 34-1 and 34-2.

The mixer 35-1 mixes the transmitted signal distributed by the distribution processing unit 32 with the received signal of the receiving antenna 34-1 to generate the beat signal (sine wave signal with the frequency difference between the transmitted signal and the received signal) which is the mixed signal, and supplies the beat signal to the A/D converter 37-1 via the filter 36-1.

The mixer 35-2 mixes the transmitted signal distributed by the distribution processing unit 32 with the received signal of the receiving antenna 34-2 to generate the beat signal which is the mixed signal, and supplies the beat signal to the A/D converter 37-2 via the filter 36-2.

The A/D converter 37-1, receiving the beat signal from the filter 36-1, converts the beat signal from an analog signal to a digital signal, and supplies the digital beat signal to the Fourier transform unit 41-1 of the signal processor 40.

The A/D converter 37-2, receiving the beat signal from the filter 36-2, converts the beat signal from an analog signal to a digital signal, and supplies the digital beat signal to the Fourier transform unit 41-2 of the signal processor 40.

The Fourier transform unit 41-1 of the signal processor 40, receiving the digital beat signal from the AD converter 37-1, computes the beat spectrum of the beat signal by executing the Fourier transform of the beat signal.

The Fourier transform unit 41-2 of the signal processor 40, receiving the digital beat signal from the AD converter 37-2, computes the beat spectrum of the beat signal by executing the Fourier transform of the beat signal.

When the Fourier transform unit 41-1 computes the beat spectrum, the peak detection processing unit 42-1 of the signal processor 40 detects a peak of the beat spectrum. More specifically, the peak detection processing unit 42-1 calculates squares of the absolute values of the beat spectrum, and detects the amplitude/phase of the beat spectrum whose computation result exceeds a prescribed threshold as a peak.

When the Fourier transform unit 41-2 computes the beat spectrum, the peak detection processing unit 42-2 of the signal processor 40 detects a peak of the beat spectrum. More specifically, the peak detection processing unit 42-2 calculates squares of the absolute values of the beat spectrum, and detects the amplitude/phase of the beat spectrum whose computation result exceeds a prescribed threshold as a peak.

The angle measurement processing unit 43 of the signal processor 40 measures the incident angle $\theta$ of a scattered wave on the receiving antennas 34-1 and 34-2 using the phase difference between the peak detected by the peak detection processing unit 42-1 and the peak detected by the peak detection processing unit 42-2. As an angle measurement method, there is a phase difference angle measurement method or a mono pulse angle measurement method, for example. In addition, a high resolution technique such as MUSIC can be applied.

When the angle measurement processing unit 43 measures the incident angle $\theta$, the stationary object decision processing unit 44 of the signal processor 40 decides whether the object associated with the peaks detected by the peak detection processing units 42-1 and 42-2 is a stationary object or not using the incident angle $\theta$.

More specifically, the stationary object decision processing unit 44 decides whether the difference between the incident angle $\theta$ measured by the angle measurement processing unit 43 and the incident angle $\varphi$ of the scattered wave obtained from the beat frequency between the peaks detected by the peak detection processing units 42-1 and 42-2 is within the prescribed value, and recognizes that the object associated with the peaks is a stationary object if the difference is within the prescribed value.

The processing contents of the stationary object decision processing unit 44 will be described concretely below.

Figure 6:
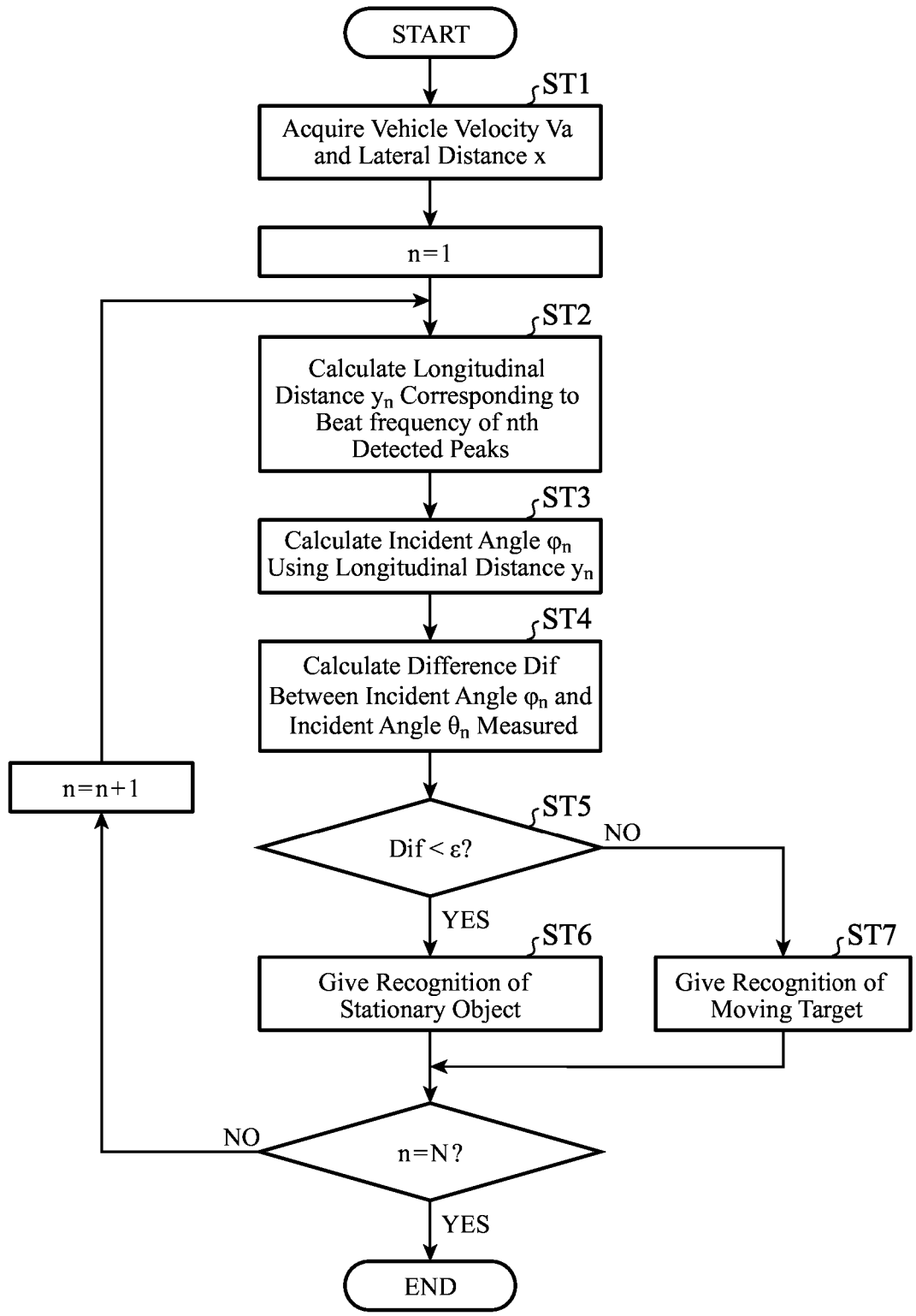
FIG. 6 is a flowchart showing processing contents of a stationary object decision processing unit 44 of the radar system of the embodiment 4 in accordance with the present invention.

FIG. 6 is a flowchart showing the processing contents of the stationary object decision processing unit 44.

Here, supposing that the positional relationships between the vehicle and the stationary object (guardrail) are just as shown in FIG. 3, the beat frequency (the beat frequency $f_{up}$ at the up-chirp and the beat frequency $f_{down}$ at the down-chirp) for the stationary object at the position (x,y) can be given by the following Expressions (10) and (11).

$$f_{up} = -\frac{2B}{cT}\sqrt{x^2 + y^2} + \frac{2V_a}{c}\frac{y}{\sqrt{x^2 - y^2}}f_0 \quad (10)$$

$$f_{down} = \frac{2B}{cT}\sqrt{x^2 + y^2} - \frac{2V_a}{c}\frac{y}{\sqrt{x^2 + y^2}}f_0 \quad (11)$$

From Expressions (10) and (11), if the velocity $V_a$ of the vehicle and the lateral distance x to the stationary object can be obtained, the stationary object decision processing unit 44 can obtain the longitudinal distance $y_n$ corresponding to the beat frequencies $u_{up\_n}$ and $f_{down\_n}$ of the nth peaks detected by the peak detection processing units 42-1 and 42-2. As for the velocity $V_a$ of the vehicle, it can obtain from the speedometer mounted in the vehicle, for example. In addition, as for the lateral distance x to the stationary object, it can obtain it using the method 1 or 2 for determining the lateral distance x described in the foregoing embodiment 1.

In addition to the foregoing, the lateral distance x can be estimated as follows. Since the Doppler frequency of the stationary object located at the lateral distance x is zero, the absolute values of the beat frequencies of Expressions (10) and (11) agree with each other. Thus, a method is conceivable which considers the peaks, as to which the absolute values of the beat frequencies of Expressions (10) and (11) agree with each other, as a stationary object; or which considers the peaks, as to which the difference between the absolute values of the beat frequencies of Expressions (10) and (11) is small (not greater than 1/T=the resolution of the beat frequency, for example), as a stationary object.

Accordingly, the stationary object decision processing unit 44 acquires the velocity $V_a$ of the vehicle and the lateral distance x to the stationary object (step ST1), substitutes the velocity $V_a$ of the vehicle and the lateral distance x to the stationary object into Expressions (10) and (11) to compute the longitudinal distance $y_n$ corresponding to the beat frequencies $f_{up\_n}$ and $f_{down\_n}$ of the nth peaks (n=1, 2, ..., N) detected (step ST2).

Incidentally, when the beat frequencies $f_{up\_n}$ and $f_{down\_n}$, the velocity $V_a$ of the vehicle and the lateral distance x to the stationary object are given, Expressions (10) and (11) become a quartic equation for y. Thus, solving the quartic equation enables computing the longitudinal distance $y_n$ corresponding to the beat frequencies $f_{up\_n}$ and $f_{down\_n}$. As a method of solving the quartic equation, Ferrari's solution is known which enables obtaining the answers directly, for example.

The stationary object decision processing unit 44, after computing the longitudinal distance $y_n$ corresponding to the beat frequencies $f_{up\_n}$ and $f_{down\_n}$ of the nth detected peaks, calculates the incident angle $\varphi_n$ of a scattered wave reflected from the stationary object at the position (x,y) and incident on the receiving antennas 34-1 and 34-2 using the longitudinal distance $y_n$ as shown in the following Expression (12) (step ST3).

$$\phi_n = \tan^{-1}\left(\frac{x}{y_n}\right) \quad (12)$$

Although the stationary object decision processing unit 44 computes the incident angle $\varphi_n$ of the scattered wave using Expression (12), it can also use a method of computing the beat frequencies $f_{up}$ and $f_{down}$ and the incident angle $\varphi$ by varying y step by step (such as varying it using the inverse of the sweep bandwidth B as a step, for example), and of employing as $\varphi_n$ the incident angle $\varphi$ corresponding to the beat frequencies $f_{up}$ and $f_{down}$ closest to the beat frequency of the peaks detected by the peak detection processing units 42-1 and 42-2 among the beat frequencies $f_{up}$ and $f_{down}$ computed while varying y.

The stationary object decision processing unit 44, after computing the incident angle $\varphi_n$ of the scattered wave, calculates the difference Dif between the incident angle $\varphi_n$ and the incident angle $\theta_n$ measured by the angle measurement processing unit 43 (the incident angle θ measured from the phase difference between the nth peaks detected) as shown in the following Expression (13) (step ST4).

$$\text{Dif} = |\theta_n - \varphi_n| \quad (13)$$

In addition, the stationary object decision processing unit 44 can decide the stationary object using the phase difference of the beat spectrum signals instead of the angles. More specifically, it computes the phase difference $\xi_n$ between $x_{1,n}$ and $x_{2,n}$ of the nth signals of the beat spectra of the receiving antennas 34-1 and 34-2 as follows.

$$Z_n = (x_{1,n}) \cdot (x_{2,n})^*$$

$$\xi_n = \tan^{-1}(Im[Z_n]/Re[Z_n])$$

where * denotes a complex conjugate, Im[·] denotes an operation for calculating an imaginary part, and Re[·] denotes an operation for calculating a real part.

A configuration is also possible which computes the phase difference $\delta_n$ as follows from the incident angle $\varphi_n$ of the scattered wave reflected from the stationary object at the position (x,y) and incident on the receiving antennas 34-1 and 34-2, and uses $\xi_n$ and $\delta_n$ instead of $\theta_n$ and $\varphi_n$.

$$\delta_n = -2\pi/\lambda \cdot d \cdot \sin(\theta_n)$$

where λ is the wavelength of the transmitted signal and d is the distance between the receiving antennas.

The stationary object decision processing unit 44, after computing the difference Dif between the incident angle $\varphi_n$ and the incident angle $\theta_n$, compares the difference Dif with a predetermined threshold ϵ, and if the Dif is less than the threshold ϵ (step ST5), it recognizes that the object associated with the nth detected peaks is a stationary object (step ST6).

In contrast, if the difference Dif is not less than the threshold ϵ (step ST5), it recognizes that the object associated with the nth detected peaks is a moving target (step ST7).

Here, although an example is shown in which the stationary object decision processing unit 44 decides whether the object associated with the nth detected peaks is a stationary object or a moving target, when the peak detection processing units 42-1 and 42-2 detect N peaks, the stationary object decision processing unit 44 executes the same processing for the N peaks to decide whether the object is a stationary object or a moving target.

As is clear from the foregoing description, according to the present embodiment 4, it is configured in such a manner that it comprises the angle measurement processing unit 43 for measuring the incident angle θ of the scattered wave upon the receiving antennas 34-1 and 34-2 using the phase difference between the peak detected by the peak detection processing unit 42-1 and the peak detected by the peak detection processing unit 42-2, and that the stationary object decision processing unit 44 decides whether the difference between the incident angle θ measured by the angle measurement processing unit 43 and the incident angle φ of the scattered wave obtained from the beat frequencies of the peaks detected by the peak detection processing units 42-1 and 42-2 is within a prescribed value or not, and recognizes that the object associated with the peaks is a stationary object if the difference is within the prescribed value. Accordingly, even in the case of the radar using the FMCW method, the present embodiment 4 offers an advantage of being able to decide accurately whether the object associated with the peaks is a stationary object or not by a small amount of calculation even if the number of detected peaks increases in the same manner as the foregoing embodiment 1.

Embodiment 5

Although the foregoing embodiment 4 shows an example in which the stationary object decision processing unit 44 decides whether the difference between the incident angle θ measured by the angle measurement processing unit 43 and the incident angle φ of the scattered wave obtained from beat frequencies of the peaks detected by the peak detection processing units 42-1 and 42-2 is within the prescribed value or not, and recognizes that the object associated with the peaks is a stationary object if the difference is within the prescribed value, a configuration is also possible in which the stationary object decision processing unit 44 decides whether the differences between the beat frequencies $f_{up}$ and $f_{down}$ detected by the peak detection processing units 42-1 and 42-2 and the beat frequencies obtained from the incident angle θ measured by the angle measurement processing unit 43 are within a prescribed value or not, and if the differences are within the prescribed value, it recognizes that the object associated with the peaks is a stationary object.

The processing contents of the stationary object decision processing unit 44 will be described concretely below.

Figure 7:
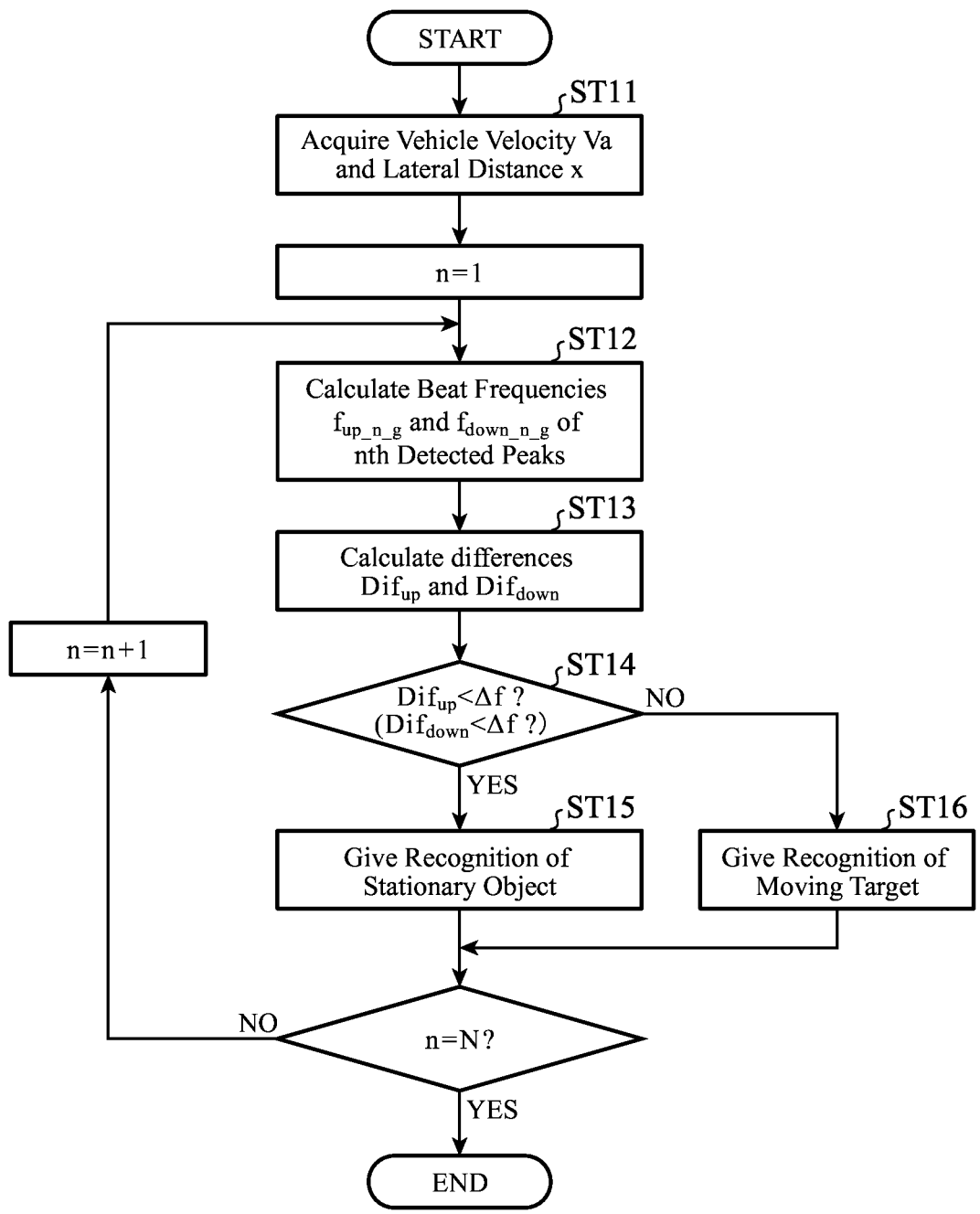
FIG. 7 is a flowchart showing processing contents of the stationary object decision processing unit 44 of the radar system of an embodiment 5 in accordance with the present invention.

FIG. 7 is a flowchart showing the processing contents of the stationary object decision processing unit 44.

When the angle measurement processing unit 43 measures the incident angle $\theta_n$ of a scattered wave using the nth (n=1, 2, . . . , N) detected peaks, the stationary object decision processing unit 44 acquires the velocity $V_a$ of the vehicle and the lateral distance x to the stationary object (step ST11), and computes the beat frequencies $f_{up\_n\_g}$ and $f_{down\_n\_g}$ of the nth detected peaks as shown in the following Expressions (14) and (15) using the velocity $V_a$ of the vehicle, the lateral distance x to the stationary object and the incident angle $\theta_n$ (step ST12).

$$f_{up\_n\_g} = -\frac{2B}{cT}\frac{x}{\sin\theta_n} + \frac{2V_a}{c}f_0\cos\theta_n \quad (14)$$

$$f_{down\_n\_g} = \frac{2B}{cT}\frac{x}{\sin\theta_n} - \frac{2V_a}{c}f_0\cos\theta_n \quad (15)$$

When the stationary object decision processing unit 44 computes the beat frequencies $f_{up\_n\_g}$ and $f_{down\_n\_g}$ of the nth detected peaks using the incident angle $\theta_n$ and so on, according to the following Expressions (16) and (17), it computes the difference $Dif_{up}$ between the beat frequency $f_{up\_n\_g}$ and the beat frequency $f_{up\_n}$ of the nth peaks detected by the peak detection processing units 42-1 and 42-2, and the difference $Dif_{down}$ between the beat frequency $f_{down\_n\_g}$ and the beat frequency $f_{down\_n}$ of the nth peaks detected by the peak detection processing units 42-1 and 42-2 (step ST13).

$$Dif_{up}=|f_{up\_n}-f_{up\_n\_g}| \quad (16)$$

$$Dif_{down}=|f_{down\_n}-f_{down\_n\_g}| \quad (17)$$

After computing the differences $Dif_{up}$ and $Dif_{down}$ the stationary object decision processing unit 44 compares the difference $Dif_{up}$ with a predetermined threshold Δf at the up-chirp, and compares the difference $Dif_{down}$ with the threshold Δf at the down-chirp.

If the difference $Dif_{up}$ is less than the threshold Δf at the up-chirp (step ST14), the stationary object decision processing unit 44 recognizes that the object associated with the nth detected peaks is a stationary object (step ST15), but if the difference $Dif_{up}$ is not less than the threshold Δf (step ST14), it recognizes that the object associated with the nth detected peaks is a moving target (step ST16).

If the difference $Dif_{down}$ is less than the threshold Δf at the down-chirp (step ST14), it recognizes that the object associated with the nth detected peaks is a stationary object (step ST15), but if the difference $Dif_{down}$ is not less than the threshold Δf (step ST14), it recognizes that the object associated with the nth detected peaks is a moving target (step ST16).

Here, although an example is shown in which the stationary object decision processing unit 44 decides whether the object associated with the nth detected peaks is a stationary object or a moving target, when the peak detection processing units 42-1 and 42-2 detect N peaks, the stationary object decision processing unit 44 executes the same processing for the N peaks to decide whether the object is a stationary object or a moving target.

As is clear from the foregoing description, according to the present embodiment 5, it is configured in such a manner that it comprises the angle measurement processing unit 43 for measuring the incident angle θ of the scattered wave upon the receiving antennas 34-1 and 34-2 using the phase difference between the peak detected by the peak detection processing unit 42-1 and the peak detected by the peak detection processing unit 42-2, and that the stationary object decision processing unit 44 decides whether the differences between the beat frequencies $f_{up\_n}$ and $f_{down\_n}$ of the peaks detected by the peak detection processing units 42-1 and 42-2 and the beat frequencies $f_{up\_n\_g}$ and $f_{down\_n\_g}$ obtained from the incident angle θ measured by the angle measurement processing unit 43 are within the prescribed value; and recognizes that the object associated with the peaks is a stationary object if the differences are within the prescribed value. Accordingly, even in the case of the radar using the FMCW method, the present embodiment 5 offers an advantage of being able to decide accurately whether the object associated with the peaks is a stationary object or not by a small amount of calculation even if the number of detected peaks increases in the same manner as the foregoing embodiment 1. In addition, it can process the up-chirp and down-chirp separately.

Incidentally, although the present embodiment 5 shows an example that computes the beat frequencies $f_{up\_n\_g}$ and $f_{down\_n\_g}$ of the nth detected peaks by substituting the lateral distance x to the stationary object into Expressions (14) and (15), if the lateral distance x to the stationary object is unknown, it is also possible to compute the lateral distance x to the stationary object by substituting the beat frequencies $f_{up\_n}$ and $f_{down\_n}$ of the nth peaks detected by the peak detection processing units 42-1 and 42-2 and the incident angles $\theta_n$ measured by the angle measurement processing unit 43 into Expressions (14) and (15).

Embodiment 6

Figure 8:
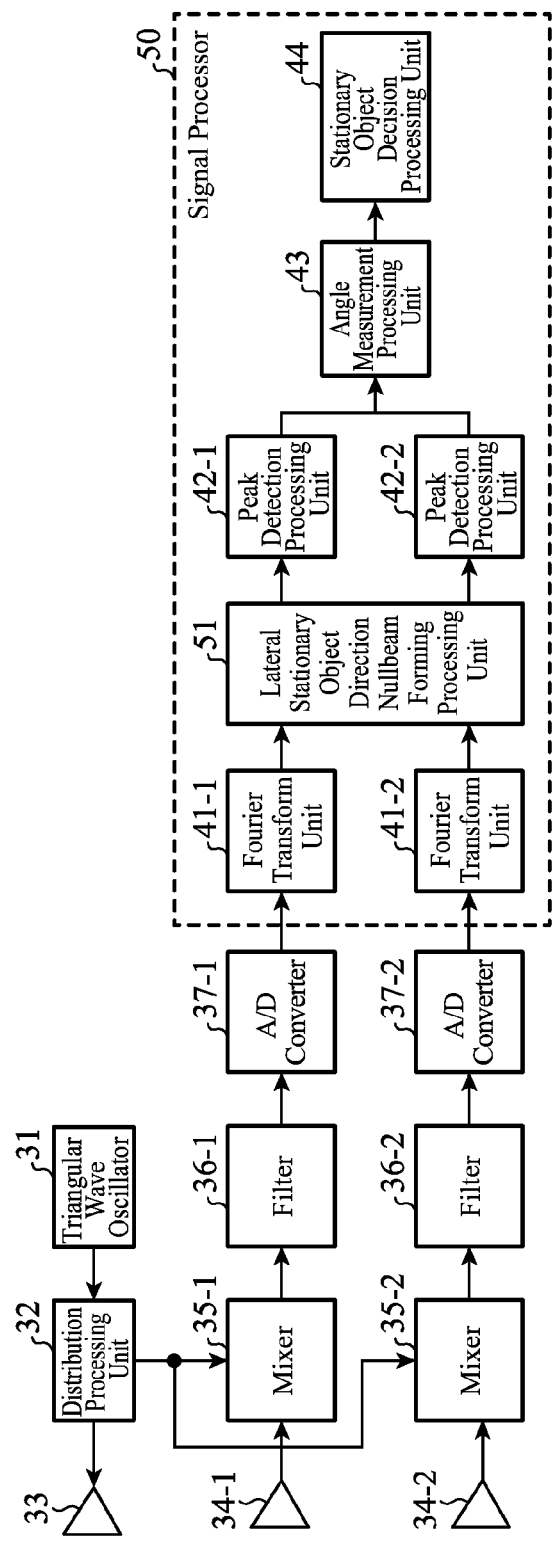
FIG. 8 is a block diagram showing a configuration of a radar system of an embodiment 6 in accordance with the present invention.

FIG. 8 is a block diagram showing a configuration of a radar system of an embodiment 6 in accordance with the present invention. In FIG. 8, since the same reference symbols designate the same or like components to those of FIG. 5, their description will be omitted.

A signal processor 50 executes the processing of analyzing the digital beat signals output from the AD converters 37-1 and 37-2, and deciding whether an object in a neighborhood is a moving target or a stationary object.

In the example of FIG. 8, although it is supposed that the components of the signal processor 50, that is, the Fourier transform units 41-1 and 41-2, a lateral stationary object direction nullbeam forming processing unit 51, the peak detection processing units 42-1 and 42-2, the angle measurement processing unit 43 and the stationary object decision processing unit 44 are each comprised of dedicated hardware (for example, a semiconductor integrated circuit including a CPU, or a one-chip microcomputer), the signal processor 50 may be comprised of a computer.

When the signal processor 50 is comprised of a computer, programs describing the processing contents of the Fourier transform units 41-1 and 41-2, lateral stationary object direction nullbeam forming processing unit 51, peak detection processing units 42-1 and 42-2, angle measurement processing unit 43 and stationary object decision processing unit 44 can be stored in a memory of the computer, and the CPU of the computer can execute the programs stored in the memory.

The lateral stationary object direction nullbeam forming processing unit 51, using the beat spectra computed by the Fourier transform units 41-1 and 41-2, executes the processing of computing the angular direction of the stationary object, and forming a nullbeam in the angular direction. Incidentally, the lateral stationary object direction nullbeam forming processing unit 51 constitutes a nullbeam forming unit.

Next, the operation will be described.

Since the present embodiment 6 is the same as the foregoing embodiment 5 except that it comprises the lateral stationary object direction nullbeam forming processing unit 51 in a previous stage of the peak detection processing units 42-1 and 42-2, only the processing contents of the lateral stationary object direction nullbeam forming processing unit 51 will be described.

The lateral stationary object direction nullbeam forming processing unit 51 computes the incident angle $\varphi_m$ of a scattered wave reflected from the stationary object at the position (x,y) and incident on the receiving antennas 34-1 and 34-2 for each beat frequency $f_{up\_m}$ at the up-chirp using the foregoing Expressions (10)-(12).

After computing the incident angle $\varphi_m$ of the scattered wave, the lateral stationary object direction nullbeam forming processing unit 51 forms a nullbeam $b_{up\_1\_m}$ in the direction of the stationary object at the position (x,y) by adding the phase difference between the two receiving antennas 34-1 and 34-2 as given by the following Expression (18).

$$b_{up\_1\_m} = -\exp\left(j2\pi\frac{d\sin\phi_m}{\lambda}\right)s_{1\_up\_m} + s_{2\_up\_m} \quad (18)$$

In Expression (18), $s_{1\_up\_m}$ denotes a complex signal of an mth beat spectrum at the up-chirp at the receiving antenna 34-1, and $s_{2\_up\_m}$ denotes a complex signal of an mth beat spectrum at the up-chirp at the receiving antenna 34-2.

In addition, $\lambda$ denotes a transmission wavelength, and d denotes element spacing of the receiving antenna 34-1 and the receiving antenna 34-2.

Although an example is shown here which forms the nullbeam $b_{up\_1\_m}$ in the direction of the stationary object as is given by Expression (18), forming a beam $b_{up\_2\_m}$ as is given by the following Expression (19) enables phase difference angle measurement or mono pulse angle measurement.

$$b_{up\_2\_m} = s_{1\_up\_m} + s_{2\_up\_m}\exp\left(-j2\pi\frac{d\sin\phi_m}{\lambda}\right) \quad (19)$$

As is clear from the foregoing description, according to the present embodiment 6, it is configured in such a manner that it comprises the lateral stationary object direction nullbeam forming processing unit 51 for computing the angular direction of the stationary object using the beat spectra computed by the Fourier transform units 41-1 and 41-2 and for forming the nullbeam in the angular direction at the previous stage of the peak detection processing units 42-1 and 42-2. Accordingly, it offers an advantage of being able to facilitate the detection of a moving target by the stationary object decision processing unit 44.

Incidentally, it is to be understood that a free combination of the individual embodiments, variations of any components of the individual embodiments or removal of any components of the individual embodiments is possible within the scope of the present invention.

INDUSTRIAL APPLICABILITY

A radar system in accordance with the present invention is suitable for an application incorporated into a control device having a collision avoidance function with a mobile unit, or a function of follow-up driving while keeping a fixed distance from the vehicle in front, for example.

DESCRIPTION OF REFERENCE SYMBOLS

1 pulse signal generator (pulse signal generator); 2 reference signal generator (transmitter-receiver); 3, 3-1, 3-2 transmitting frequency converter (transmitter-receiver); 4, 4-1, 4-2 transmitting amplifier (transmitter-receiver); 5, 5-1, 5-2 circulator (transmitter-receiver); 6, 6-1, 6-2 transmitting-receiving antenna (transmitter-receiver); 7, 7-1, 7-2 receiving amplifier (transmitter-receiver); 8, 8-1, 8-2 receiving frequency converter (transmitter-receiver); 9, 9-1, 9-2 AD converter (transmitter-receiver); 10 signal processor; 11 pulse compression processing unit (range Doppler map generator); 12 pulse hit interval integration processing unit (range Doppler map generator); 13 peak detection processing unit (peak detector); 14 stationary object decision processing unit (stationary object deciding unit); 20 signal processor; 21 angle measurement processing unit (angle measuring unit); 22 stationary object decision processing unit (stationary object deciding unit); 31 triangular wave oscillator (transmitted signal generator); 32 distribution processing unit (signal transmitter); 33 transmitting antenna (signal transmitter); 34-1, 34-2 receiving antenna (signal receiver); 35-1, 35-2 mixer (beat signal generator); 36-1, 36-2 filter; 37-1, 37-2 A/D converter; 40 signal processor; 41-1, 41-2 Fourier transform unit (beat spectrum computing unit); 42-1, 42-2 peak detection processing unit (peak detector); 43 angle measurement processing unit (angle measuring unit); 44 stationary object decision processing unit (stationary object deciding unit); 50 signal processor; 51 lateral stationary object direction nullbeam forming processing unit (nullbeam forming unit).

What is claimed is:

1. A radar system that is installed in a vehicle, comprising:
   a pulse signal generator that produces a pulse signal;
   a transmitter-receiver that emits the pulse signal produced by the pulse signal generator into a space, and receives scattered waves of the pulse signal reflected from objects including a target;
   a range Doppler map generator that carries out pulse compression of the received signal of the transmitter-receiver using the pulse signal produced by the pulse signal generator, and creates a range Doppler map showing correspondence between range and first Doppler frequency by integrating the received signal after the pulse compression for each pulse hit;
a peak detector that detects a peak with signal power not less than a threshold in the range Doppler map created by the range Doppler map generator; and
a stationary object deciding unit that
   determines a lateral distance between the vehicle and one of the objects associated with the detected peak, and
   recognizes that the object associated with the detected peak is a stationary object when the first Doppler frequency corresponding to the detected peak equals a second Doppler frequency computed from a range corresponding to the detected peak shown in the range Doppler map, from the determined lateral distance, and from a velocity of the vehicle.

2. The radar system according to claim 1, wherein the stationary object deciding unit identifies a peak corresponding to a shortest range among one or more peaks which are detected by the peak detector and whose first Doppler frequency is zero, and determines that a range corresponding to the identified peak shown in the range Doppler map is the lateral distance when a signal power of the identified peak is not less than a prescribed value.

3. The radar system according to claim 1, further comprising a tracking module that has a function of tracking objects, wherein
the stationary object deciding unit determines the lateral distance by observing a lateral distance between the vehicle and the object associated with the detected peak on a basis of tracking results of the tracking module.

4. The radar system according to claim 1, wherein
the stationary object deciding unit, for each peak detected by the peak detector, decides that the object associated with the peaks is a stationary object when the first Doppler frequency corresponding to the peaks equals a second Doppler frequency computed from the range corresponding to the peaks, from a prescribed lateral distance between the vehicle and the object, and from the velocity of the vehicle; and
alters the prescribed lateral distance when the first Doppler frequency corresponding to all the peaks detected by the peak detector differs from a third Doppler frequency computed from the distance corresponding to the peaks, from the prescribed lateral distance between the vehicle and the object, and from the velocity of the vehicle, and decides that the object associated with the peaks is the stationary object when the second Doppler frequency computed using a lateral distance after the alteration equals the first Doppler frequency corresponding to the peaks.

5. A radar system that is installed in a vehicle, comprising:
a pulse signal generator that produces a pulse signal;
a plurality of transmitter-receivers that emit the pulse signal produced by the pulse signal generator into a space, and that receive scattered waves of the pulse signal reflected from objects including a target;
a plurality of range Doppler map generators that carry out pulse compression of the received signals of the transmitter-receivers using the pulse signal produced by the pulse signal generator, and generate a range Doppler map showing correspondence between range and first Doppler frequency by integrating the received signals after the pulse compression for each pulse hit;
a plurality of peak detectors that detect a peak with signal power not less than a threshold in the range Doppler maps created by the range Doppler map generators;
an angle measurer that measures an incident angle of the scattered wave on the transmitter-receivers using the plurality of peaks detected by the peak detectors; and
a stationary object deciding unit that
   determines a lateral distance between the vehicle and one of the objects associated with the detected peak, and
   recognizes that the object associated with the detected peak is a stationary object when the range corresponding to the peaks detected by the peak detectors equals a range obtained from the determined lateral distance and from the incident angle measured by the angle measurer, or when the first Doppler frequency corresponding to the peaks detected by the peak detectors equals a second Doppler frequency computed from the velocity of the vehicle and from the incident angle measured by the angle measurer.

6. A radar system that is installed in a vehicle, comprising:
a transmitted signal generator that produces a transmitted signal whose frequency varies linearly within a fixed frequency band;
a signal transmitter that emits the transmitted signal produced by the transmitted signal generator into a space;
a plurality of signal receivers that receive scattered waves of the transmitted signal which is emitted by the signal transmitter, and is reflected from objects including a target;
a plurality of beat signal generators that mix the transmitted signal produced by the transmitted signal generator with the received signals of the signal receivers to generate beat signals which are the mixed signals of them;
a plurality of beat spectrum computers that compute beat spectra of the beat signals produced by the beat signal generators;
a plurality of peak detectors that detect peaks of the beat spectra calculated by the beat spectrum computers;
an angle measurer that measures an incident angle of the scattered wave on the signal receivers using the peaks detected by the plurality of peak detectors; and
a stationary object deciding unit that decides whether an object associated with the peaks detected by the peak detectors is a stationary object or not using the incident angle measured by the angle measurer, wherein
the stationary object deciding unit
   determines a lateral distance between the vehicle and one of the objects associated with the detected peak,
   computes a longitudinal distance between the vehicle and the stationary object from a beat frequency corresponding to the peaks detected by the peak detectors, from a velocity of the vehicle, from the determined lateral distance, and from a sweep time and a sweep bandwidth set,
   computes an incident angle of the scattered wave using the longitudinal distance, and
   recognizes that the object associated with the peaks is the stationary object when the difference between the incident angle computed and the incident angle measured by the angle measurer is within a prescribed value.

7. A radar system that is installed in a vehicle, comprising:
a transmitted signal generator that produces a transmitted signal whose frequency varies linearly within a fixed frequency band;
a signal transmitter that emits the transmitted signal produced by the transmitted signal generator into a space;
a plurality of signal receivers that receive scattered waves of the transmitted signal which is emitted by the signal transmitter, and is reflected from objects including a target;
a plurality of beat signal generators that mix the transmitted signal produced by the transmitted signal generator with the received signals of the signal receivers to generate beat signals which are the mixed signals of them;
a plurality of beat spectrum computers that compute beat spectra of the beat signals produced by the beat signal generators;
a plurality of peak detectors that detect peaks of the beat spectra calculated by the beat spectrum computers;
an angle measurer that measures an incident angle of the scattered wave on the signal receivers using the peaks detected by the plurality of peak detectors; and
a stationary object deciding unit that decides whether an object associated with the peaks detected by the peak detectors is a stationary object or not using the incident angle measured by the angle measurer, wherein
the stationary object deciding unit
determines a lateral distance between the vehicle and one of the objects associated with the detected peak,
computes a beat frequency from the incident angle measured by the angle measurer, from a velocity of the vehicle, from the determined lateral distance, and from a sweep time and sweep bandwidth set, and
recognizes that the object associated with the detected peak is a stationary object when a difference between the beat frequency and a beat frequency corresponding to the detected peak is within a prescribed value.

* * * * *